US008869357B2

(12) United States Patent
Midorikawa et al.

(10) Patent No.: US 8,869,357 B2
(45) Date of Patent: Oct. 28, 2014

(54) SWITCH-EQUIPPED BUCKLE DEVICE (75) Inventors: Yukinori Midorikawa, Yokohama (JP); Ayaki Oyamada, Yokohama (JP)

(73) Assignee: Autoliv Development AB, Vågårda (SE)

( * ) Notice: Subject to any disclaimer, the term of this patent is extended or adjusted under 35 U.S.C. 154(b) by 168 days.

(21) Appl. No.: 13/132,237

(22) PCT Filed: Nov. 26, 2009

(86) PCT No.: PCT/JP2009/069986
§ 371 (c)(1), (2), (4) Date: Jun. 3, 2011

(87) PCT Pub. No.: WO2010/064576
PCT Pub. Date: Jun. 10, 2010

(65) Prior Publication Data
US 2011/0232052 A1    Sep. 29, 2011

(30) Foreign Application Priority Data
Dec. 1, 2008   (JP) .................. 2008-306101

(51) Int. Cl.
A44B 11/26 (2006.01)
B60R 22/48 (2006.01)
A44B 11/25 (2006.01)
H01H 15/04 (2006.01)

(52) U.S. Cl.
CPC ............. *B60R 22/48* (2013.01); *A44B 11/2523* (2013.01); *H01H 15/04* (2013.01); *B60R 2022/4816* (2013.01)
USPC .................................. 24/640; 24/633; 24/641

(58) Field of Classification Search
USPC .......................................... 24/633, 640, 641
See application file for complete search history.

(56) References Cited

U.S. PATENT DOCUMENTS

| 4,733,444 | A  | * | 3/1988  | Takada .......................... 24/641 |
| 5,584,108 | A  | * | 12/1996 | Pleyer ........................... 24/641 |
| 6,076,239 | A  | * | 6/2000  | Kopetzky et al. ............. 24/633 |
| 6,216,323 | B1 | * | 4/2001  | Oyamada ...................... 24/641 |
| 6,381,815 | B1 | * | 5/2002  | Yamaguchi et al. .......... 24/633 |
| 6,427,297 | B1 | * | 8/2002  | Yamaguchi et al. .......... 24/641 |
| 6,725,509 | B1 | * | 4/2004  | Lee et al. ...................... 24/641 |
| 6,907,646 | B2 | * | 6/2005  | Lee et al. ...................... 24/633 |
| 6,931,696 | B2 | * | 8/2005  | Lee et al. ...................... 24/633 |
| 7,240,407 | B2 | * | 7/2007  | Kawai et al. .................. 24/641 |
| 2006/0207074 | A1 | * | 9/2006 | Takao ............................ 24/633 |

FOREIGN PATENT DOCUMENTS

| JP | 5-25634     | 4/1993 |
| JP | 2001-224407 | 8/2001 |
| JP | 2005-190906 | 7/2005 |

OTHER PUBLICATIONS

International Search Report for PCT/JP2009/069986 Mailed Feb. 16, 2010 (2 pages).

* cited by examiner

*Primary Examiner* — Robert J Sandy
*Assistant Examiner* — David Upchurch
(74) *Attorney, Agent, or Firm* — Brinks Gilson & Lione (57) ABSTRACT

A switch-equipped buckle device capable of accurately detecting an attachment-detachment state of a tongue plate by mounting fixed contacts immovably therein. The switch-equipped buckle device has, inside a buckle body, a slide switch that detects a state of attachment of the tongue plate according to the sliding position of an ejector. A slider of the slide switch is integrated with the ejector, and three fixed contacts of the slide switch are integrated with a lower case by insert molding.

16 Claims, 4 Drawing Sheets

201(NC)   203(COM)   202(NO)

(b)

201(NC)   203(COM)   100   202(NO)

SWITCH-EQUIPPED BUCKLE DEVICE

BACKGROUND

1. Field of the Invention

The present invention relates to a buckle device equipped with a switch that detects the state of attachment of the tongue plate, which is provided at the seat belt, to the buckle body.

2. Related Technology

Seat belt devices for protecting occupants during an accident such as collision have been mounted on seats of various transportation mechanisms such as automobiles. The seat belt device of such kind is provided with a buckle device for attaching and detaching the seat belt in an easy manner.

The buckle device of this kind is constituted by a tongue plate having the seat belt (waving belt) passed therethrough and a buckle body serving to engage and disengage the tongue plate. A latch member that locks the tongue plate, a base member that movably supports the latch member, an ejector that slides following the insertion or removal of the tongue plate and moves the latch member by such sliding movement, and a switch that detects the state of engagement of the tongue plate with the buckle body are typically provided inside an outer case of the buckle body.

Patent Document 1, Japanese Patent Application Publication No. 2005-190906, and Patent Document 2, Japanese Patent Application Publication No. 2001-224407, disclose buckle devices that use as the aforementioned switch a slide switch having a fixed contact and a movable contact that switches the switch state by sliding with respect to the fixed contact.

In the buckle devices described in these patent documents, a slide switch is constituted by mounting a base plate or a switch case provided with a fixed contact inside an outer case and mounting a movable contact on a slider provided so as to slide with respect to the base plate or switch case. The switch is set so that when the tongue plate is locked to the buckle body, the slider moves and assumes the ON state, and when locking of the tongue plate is released, the slider returns to the original position and assumes the OFF state.

However, in the conventional buckle device, the fixed contact is mounted on a member such as the base plate or switch case, and this member is then mounted on the outer case or base frame. Therefore, it is possible that the fixed contact will move and the position detection will not be performed reliably.

SUMMARY

The present invention has been created with the foregoing in view, and it is an object of the present invention to provide a switch-equipped buckle device capable of accurately detecting an attachment-detachment state of a tongue plate by mounting fixed contacts immovably.

In order to attain the above-described object, a switch-equipped buckle device in accordance with the present invention may have the following features (1) to (5).

(1) A switch-equipped buckle device including:
a tongue plate provided in a seat belt;
a buckle body which has a resin outer case, and to and from which the tongue plate is attached and detached;
a movable member that is provided inside the outer case, slides from a position during detachment to a position during attachment when the tongue plate is attached to the buckle body, and slides from the position during attachment to the position during detachment when the attachment of the tongue plate is released; and
a slide switch that detects a state of attachment of the tongue plate according to a slide position of the movable member, wherein
a movable contact of the slide switch is provided at the movable member, and a fixed contact of the slide switch is provided integrally with the outer case.

(2) The switch-equipped buckle device configured according to clause (1) above, wherein the buckle body includes the outer case, a frame disposed inside the outer case and having an insertion path for the tongue plate, a latch member that is rotatably provided on the frame and rotates to latch the tongue plate when the tongue plate is inserted into the insertion path, and an ejector that is provided on the frame so as to be capable of sliding along an attachment-detachment direction of the tongue plate, and serves as the movable member for pushing the tongue plate out of the buckle body by sliding from the position during detachment to the position during attachment when the tongue plate is inserted into the insertion path, and by sliding from the position during attachment to the position during detachment when latching to the tongue plate is released, and the movable contact is provided at the ejector.

(3) The switch-equipped buckle device configured according to clause (1) or (2) above, wherein the fixed contact is constituted by first, second and third contacts, the third contact is a common contact, and the first contact, second contact and third contact are arranged in this order with a spacing along a sliding direction of the movable contact, and when the movable member is at the position during detachment, the movable contact is in contact with both the first contact and the third contact, and when the movable member is at the position during attachment, the movable contact is in contact with both the second contact and the third contact.

(4) The switch-equipped buckle device configured according to any of clauses (1) to (3) above, wherein the fixed contacts are respectively constituted by metal plates.

(5) The switch-equipped buckle device configured according to clause (4) above, wherein the metal plates are integrated with the outer case by insert molding.

With the switch-equipped buckle device of the configuration described in clause (1) above, the fixed contacts of the slide switch that detect the state of attachment of the tongue plate are provided integrally with the resin outer case. Therefore, the fixed contacts are immobilized inside the buckle body and the positional accuracy of the fixed contacts is increased. As a result, the relative positions of the tongue plate and the buckle body can be detected with good accuracy and erroneous operation of the switch is prevented.

In the switch-equipped buckle device of the configuration described in clause (2) above, the movable contact may be provided at the ejector (in the present embodiment, the movable contact is provided at the ejector, with the slider being interposed therebetween). Therefore, a signal corresponding to the slide position of the ejector can be taken out with good accuracy from the contact state of the movable contact member and the fixed contacts.

With the switch-equipped buckle device of the configuration described in clause (3) above, the non-attachment state of the tongue plate to the buckle body can be detected by the conduction state of the first contact and the third contact when the movable contact is in contact with both the first contact and the third contact. The attachment state of the tongue plate to the buckle body can be detected by the conduction state of the second contact and the third contact when the movable contact is in contact with both the second contact and the third contact. In either case, the reliable detection signals can be taken out. Therefore, the state of attachment of the seat belt can be monitored with high reliability, for example, by using the first contact as a normally closed terminal (normally closed contact terminal) and using the second contact as a normally open terminal (normally open contact terminal).

With the switch-equipped buckle device of the configuration described in clause (4) above, the fixed contacts are constituted by the metal plates. Therefore detection reliability can be increased.

With the switch-equipped buckle device of the configuration described in clause (5) above, the metal plates are integrated with the outer case by insert molding. Therefore, the metal plates can be positioned with better accuracy and detection reliability can be further increased.

BRIEF DESCRIPTION OF THE DRAWINGS

FIG. 4(a) shows the state in which the tongue plate is not attached to the buckle body and the slider is in the front position; and FIG. 4(b) shows the state in which the tongue plate is attached to the buckle body and the slider is in the rear position.

DETAILED DESCRIPTION

Figure 1:
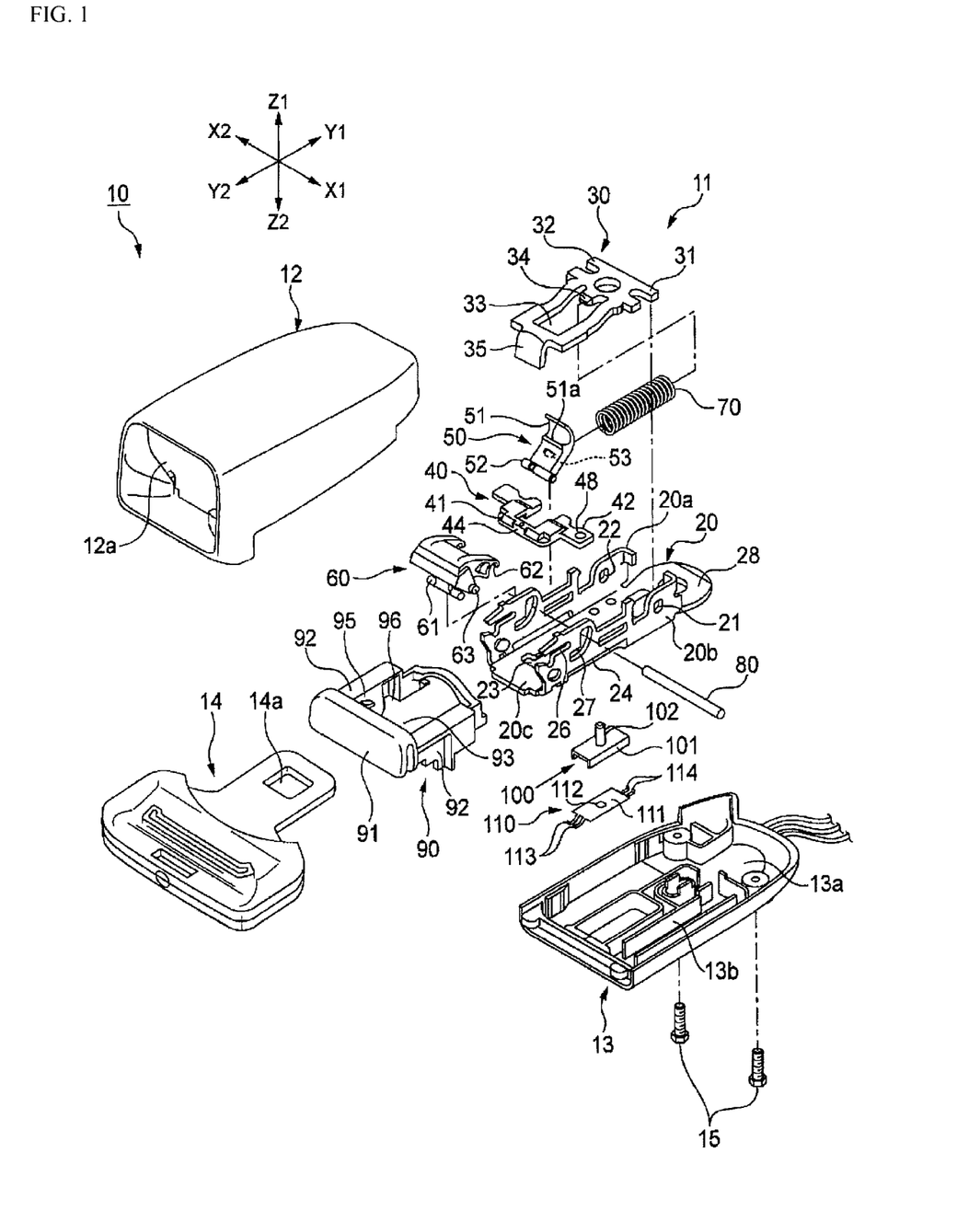
FIG. 1 is an exploded perspective view of the buckle device according to an embodiment of the present invention.

The preferred embodiments of the present invention will be described below with reference to the appended drawings. As shown in FIG. 1, a buckle device 10 is constituted by a buckle body 11 having an upper case 12 and a lower case 13 serving as an outer case and a tongue plate 14 detachably attached to the buckle body 11.

A metal frame (base member) 20 with a U-shaped cross section, which is provided with a pair of side walls 20a, 20b and a bottom wall 20c provided between the pair of side walls 20a, 20b and in which the upper surface of the bottom wall 20c serves as an insertion path of the tongue plate 14 is provided inside the outer case, and a metal latch member 30 is attached on the inside of the frame 20.

The latch member 30 has at one end thereof (end on the Y1 side shown in the figure) support arm portions 31, 32 protruding in the X1 and X2 directions shown in the figure, and the latch member is supported on the frame 20, so that the latch member can swing in the Z1 and Z2 direction shown in the figure, by the engagement of these support arm portions 31, 32 with support holes 21, 22 provided in the side walls 20a, 20b of the frame 20. An opening 33 is provided in the center of the latch member 30, and a locking protrusion 34 that protrudes in the Y2 direction shown in the figure is provided at the edge of the opening 33. Further, a latch protruding piece 35 protruding in the Z2 direction in the figure is provided at the other end (end on the Y2 side shown in the figure) of the latch member 30. The latch protruding piece 35 is a portion that engages with and disengages from a latch hole 23 formed in the bottom wall 20c of the frame 20.

Further, a resin ejector 40 is provided between the latch member 30 and the bottom wall 20c of the frame 20. The ejector 40 is provided so as to enable sliding thereof along the attachment-detachment direction of the tongue plate 14 on the frame 20, and when the tongue plate 14 is inserted into the insertion path of the frame 20, the ejector slides from a position during detachment to a position during attachment, and when latching of the tongue plate 14 with the latch member 30 is released, the ejector slides from the position during attachment to the position during detachment, thus acting to push the tongue plate 14 out of the buckle body 11.

The ejector 40 has a base portion 41 formed in a U-like shape and arm portions 42 extending in both side directions (X1 and X2 directions) from both distal ends of the base portion 41. A pin hole 48 for coupling the below-described slider 100 is provided in one arm portion 42. Further, a push portion 44 is provided at the surface of the base portion 41 on the Y2 side (shown in the figure).

Both arm portions 42 are inserted through slits 24 formed between the side walls 20a, 20b and the bottom wall 20c of the frame 20, and each distal end extends to the outside of the frame 20. By sliding the arm portions 42 inside these slits 24, it is possible to cause the ejector 40 to slide in the insertion-removal direction of the tongue plate 14 on the frame 20.

A cantilever 50 is rotatably attached to the U-shaped base portion 41 of the ejector 40. The cantilever has a shaft portion 52 inserted into a holding hole (not shown in the figure) of the U-shaped base portion and a locking portion 51 with a distal end formed into a curved surface. A spring holding protruding portion 53 is formed at the surface (rear side in the figure) of the cantilever 50, and an impelling member 70 constituted by a coil spring or the like is inserted in a compressed state thereof between the spring holding protruding portion 53 and the locking protrusion 34 of the latch member 30. An impelling force acts between the spring holding protruding portion 53 and the locking protrusion 34 in the direction of mutual separation thereof. Therefore, the impelling member 70 impels the locking portion 51 side, which is the distal end of the cantilever 50, at all times in the counterclockwise direction shown in FIG. 1.

A notch 26 constituted by a long groove extending in the Y1 and Y2 direction shown in the figure and a concave groove sinking in the Z2 direction shown in the figure is formed at the Y2 side (as shown in the figure) of the two side walls 20a, 20b of the frame 20. A rotating shaft 63 of a stopper 60 is swingably engaged with the concave groove of the notch 26. A working shaft 61 extending in the X1 and X2 direction shown in the figure is formed at a lower end, in the Z2 direction shown in the figure, of the stopper 60, and a catch 62 is formed integrally with the distal end in the Y1 direction. The catch 62 is disposed on the movement trajectory of the below-described lock bar 80.

Guiding holes 27 punched in a substantially L-like shape are symmetrically formed in the two side walls 20a, 20b of the frame 20, the lock bar 80 is inserted into these guiding holes 27, and the lock bar 80 can move together with the cantilever 50 inside the guiding holes 27. Further, the lock bar 80 is engaged with the locking portion 51 of the cantilever 50 and held by the catch 62 of the stopper 60.

A release button 90 that is free to move in the attachment-detachment direction of the tongue plate 14 is provided at the Y2 side of the frame 20. The release button 90 has an operation portion 91 that is exposed to the outside via an opening 12a provided at the Y2 side of the upper case 12 and a leg portion 92 extending from the operation portion 91 in the Y1 direction shown in the figure. An operating recess 93 is formed at the distal end of the leg portion 92. Both ends of the lock bar 80 extending to the outside from the guiding holes 27 of the frame 20 are inserted into the operating recess 93.

Guide protrusions 95 protruding inward and also extending in the Y1 and Y2 directions shown in the figure are formed at both inner surfaces of the leg portion 92. The guide protrusions 95 are inserted into the long groove of the notch 26 formed in the frame 20. When the release button 90 moves in the Y1 and Y2 directions, the guide protrusions 95 are guided by the long groove of the notch 26. Therefore, the release button 90 can move parallel to the bottom wall 20c of the frame 20.

Further, a lower end portion 96 protruding from the surface of the operation portion 91 on the Y1 side is provided at the release button 90. A bearing groove (not shown in the figure) extending in the X direction (shown in the figure) is formed at the lower end portion 96, and the working shaft 61 of the stopper 60 is rotatably inserted into the bearing groove. As a result, where the operation portion 91 of the release button 90 is operated by pushing in the Y1 direction shown in the figure, the bearing groove applies a pressure to the working shaft 61 of the stopper 60 in the Y1 direction shown in the figure. As a result, the stopper 60 can be rotated counterclockwise as shown in FIG. 1. Likewise, where the release button 90 is moved in the Y2 direction shown in the figure, the stopper 60 can be rotated clockwise as shown in FIG. 1.

A gap into which the distal end portion of the tongue plate 14 can be inserted is provided between the lower end portion 96 of the release button 90 and the bottom wall 20c of the frame 20. Further, a plate attachment portion 28 is protruded at the Y1 side of the bottom wall 20c of the frame 20, and the plate attachment portion 28 is fixed to a vehicle frame or the like.

The configuration of the switch that monitors (detects) whether the tongue plate 14 has been attached to the buckle body 11 will be explained below. In the present embodiment, a slide switch is used.

The aforementioned ejector 40 corresponds to a movable member that slides from a front position (position on the Y2 side shown in the figure) which is the position during detachment to the rear position (position on the Y1 side shown in the figure) which is the position during attachment when the tongue plate 14 is attached to the buckle body 11, and slides from the rear position which is the position during attachment to the front position which is the position during detachment when the attachment of the tongue plate 14 is released. Therefore, the slide switch takes out a signal detecting the state of attachment of the tongue plate 14 according to the slide position of the ejector 40.

Figure 2:
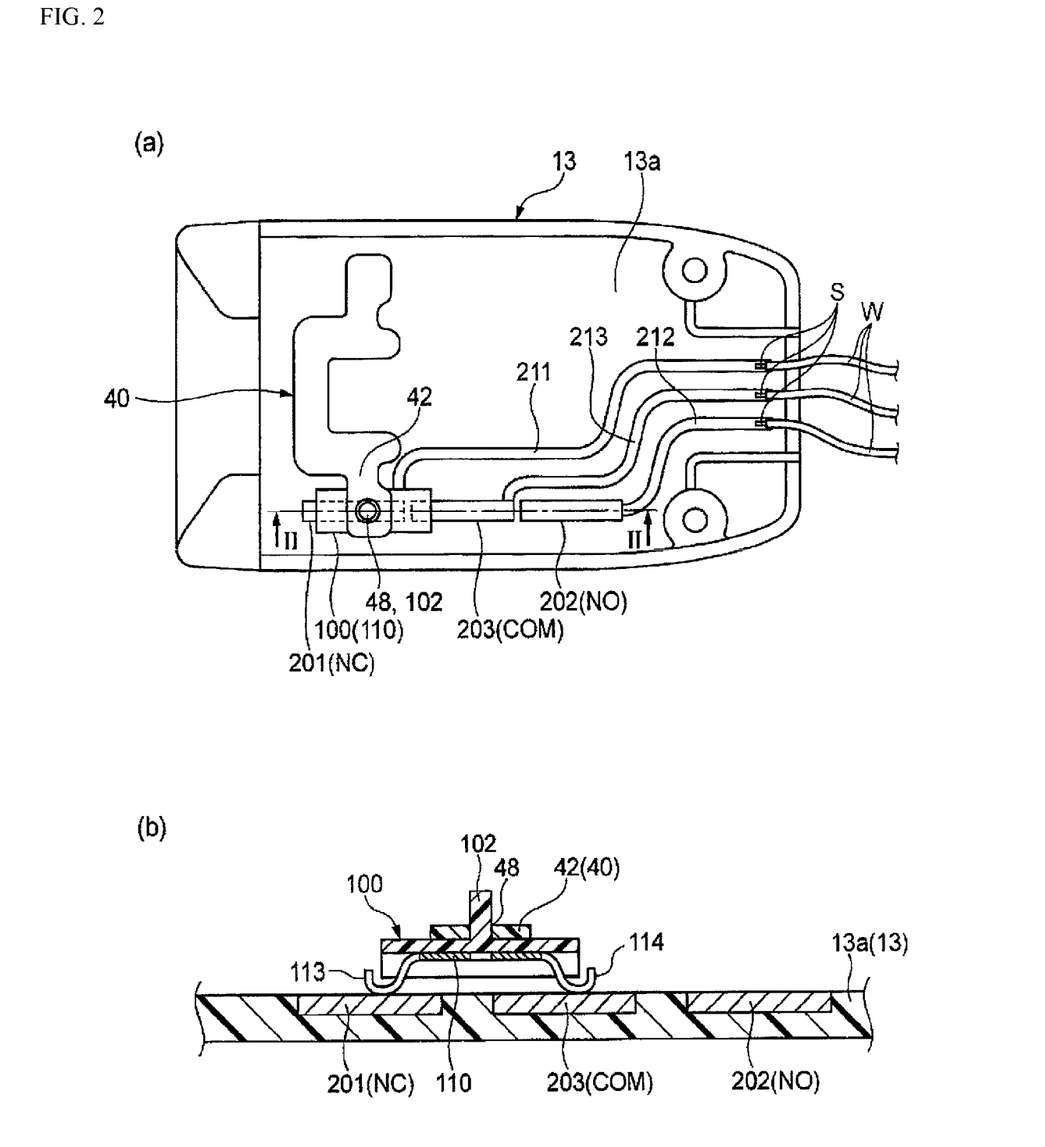
FIG. 2(a) is a plan view illustrating the configuration of the slide switch portion of the buckle device.
FIG. 2(b) is a cross-sectional view along the II-II arrow in FIG. 2(a).
Figure 3:
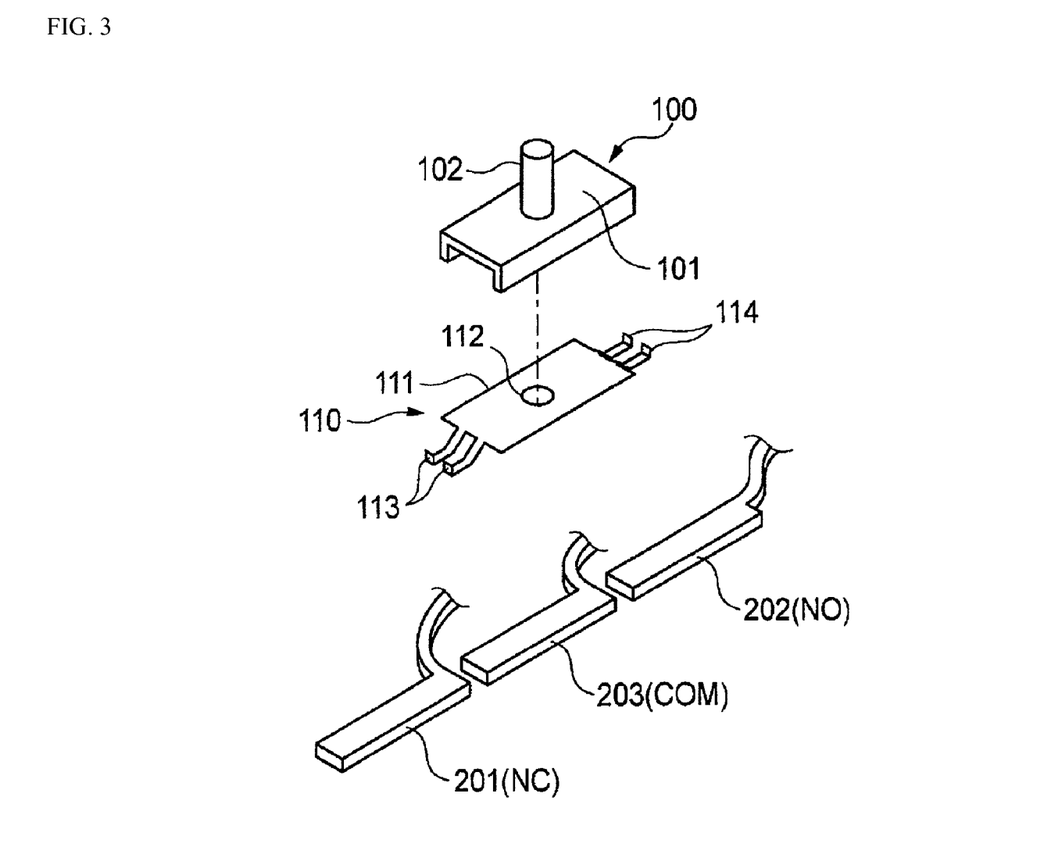
FIG. 3 is an exploded perspective view illustrating the configuration of the slide switch portion of the buckle device.

As shown in FIG. 2 and FIG. 3, the slide switch is constituted by three fixed contacts 201, 202, 203 and one movable contact member (movable contact) 110. The slider 100 is joined to the ejector 40, and the movable contact member 110 is attached to the lower surface of the slider 100. More specifically, the slider 100 is integrally joined to the ejector 40 by fitting a pin 102 provided in a protruding condition in the center of a flat portion 101 of the slider 100 into the pin hole 48 of the arm portion 42 of the ejector 40. Further, the movable contact member 110 is integrally fixed to the slider 100 by joining a flat portion 111 of the movable contact member 110 by using a hole 112 punched in the center thereof to the lower surface of the flat portion 101 of the slider 100. Spring contacts 113, 114 that are in elastic contact with the contact surfaces of the fixed contacts 201, 202, 203 are provided at both ends, in the movement direction of the slider 100, of the movable contact member 110.

The three fixed contacts 201, 202, 203 are arranged in a row with a spacing in the movement direction of the slider 100. In this case, the three fixed contacts 201, 202, 203 are arranged in a row along the direction in which the tongue plate 14 is inserted in the following order: first fixed contact 201, third fixed contact 203, and second fixed contact 202.

The length and spacing of the fixed contacts 201, 202, 203 are set as appropriate. As shown in FIG. 2(b) and FIG. 4(a), when the tongue plate 14 is not attached to the buckle body 11 and the slider 100 is at the front position, which is the position during detachment, the movable contact member 110 is in contact with both the first fixed contact 201 and the third fixed contact 203 (in other words, the spring contacts 113, 114 at both ends of the movable contact member 110 are in contact with the first fixed contact 201 and the third fixed contact 203, respectively). Therefore, the first fixed contact 201 and the third fixed contact 203 are in the state of mutual electric conduction via the movable contact member 110.

As shown in FIG. 4(b), when the tongue plate 14 is attached to the buckle body 11 and the slider 100 is at the rear position, which is the position during attachment, the movable contact member 110 is in contact with both the third fixed contact 203 and the second fixed contact 202 (in other words, the spring contacts 113, 114 at both ends of the movable contact member 110 are in contact with the third fixed contact 203 and the second fixed contact 202, respectively). Therefore, the third fixed contact 203 and the second fixed contact 202 are in the state of mutual electric conduction via the movable contact member 110.

Figure 4:
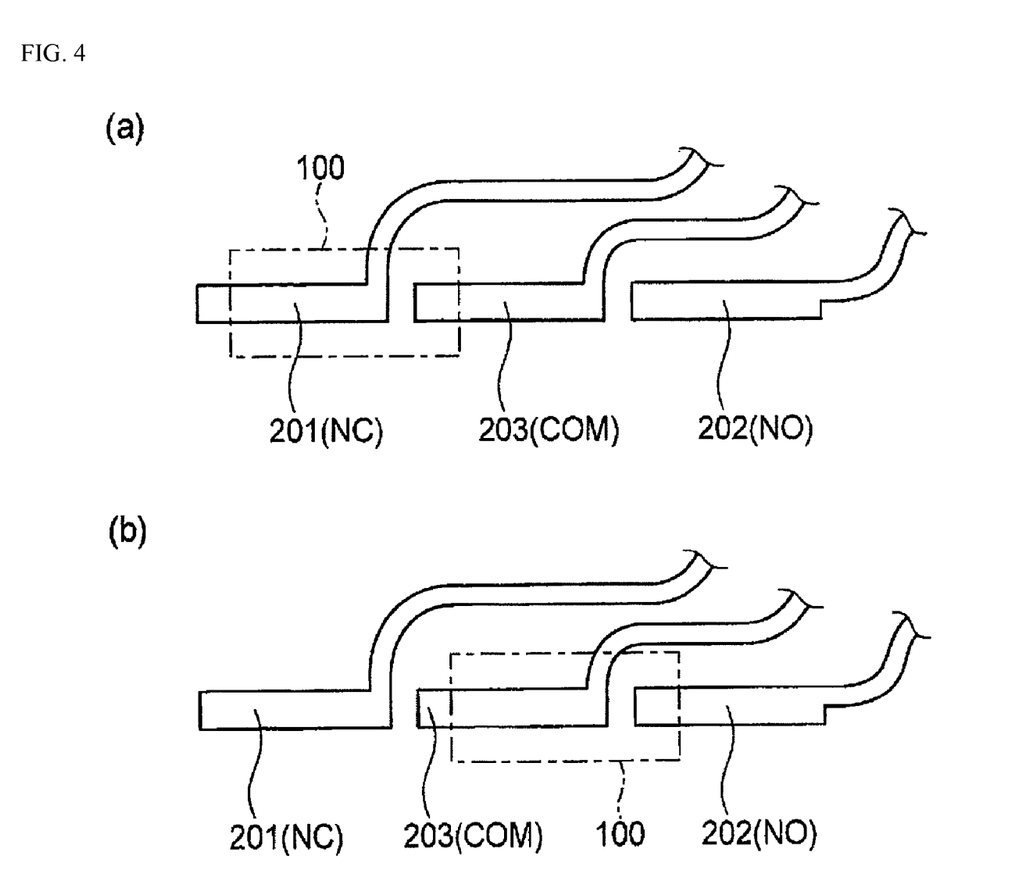
FIG. 4 shows how the detection signal is switched depending on the variation in the slide position of the slide switch.

In this configuration, the central third fixed contact 203 is a common contact (COM), the first fixed contact 201 is a normally closed contact (NC), and the second fixed contact 202 is a normally open contact (NO).

The first fixed contact 201, third fixed contact 203, and second fixed contact 202 in this case are constituted by metal plates plated with tin or copper and provided integrally so that the upper surface of each fixed contact is exposed at the upper surface of the bottom wall 13a of the lower case 13 made from a resin (for example, a PP resin). In particular, in the present embodiment, the metal plates constituting the fixed contacts 201, 202, 203 are integrated by insert molding with the lower case 13.

Leads 211, 212, 213 arranged on the upper surface of the bottom wall 13a of the lower case 13 are connected to the fixed contacts 201, 202, 203, respectively, and an external power cable W is connected to the leads 211, 212, 213 in a connection point S. The connection of the external electric cable W to the leads 211, 212, 213 can be performed by using any means such as crimping, welding, and soldering.

When the fixed contacts 201, 202, 203 and the leads 211, 212, 213 respectively connected thereto are integrated by insert molding with the lower case 13, the leads 211, 212, 213 may be passed through below the rising wall 13b that rises from the bottom wall 13a of the lower case 13 to ensure stronger fixing to the lower case 13.

Therefore, the buckle body 11 according to the present embodiment has the frame 20, latch member 30, ejector 40, cantilever 50, stopper 60, impelling member 70, lock bar 80, and slide switch, and the upper case 12 and lower case 13 where the aforementioned components are disposed are fixed with a screw 15.

The operation of the buckle device 10 will be explained below.

(1) Initial State (Non-latched State=Seat Belt Non-attached State)

In the initial state in which the tongue plate 14 is not attached to the buckle body 11, the release button 90 located inside the buckle body 11 is slightly moved in the Y1 direction shown in the figure and the ejector 40 is moved in the Y2 direction shown in the figure, which is on the opening 12a side, by the impelling force of the impelling member 70. Further, the cantilever 50 is rotated about the shaft portion 52, and the stopper 60 is rotated about the rotating shaft 63 correspondingly to the position of the release button 90 in the Y2 direction. In this case, the lock bar 80 moves to the upper end portion in vertical direction inside the guiding hole 27 and assumes a state in which the lock bar is not caught by the catch 62 of the stopper 60.

However, since the cantilever 50 has rotated clockwise and the height position of the spring holding protruding portion 53 is lower, on the Z2 side shown in the figure, than the height position of the locking protrusion 34, the locking portion 51 of the cantilever 50 that has received the horizontal component (component in the Y direction) of the impelling force of the impelling member 70 applies contact pressure to the lock bar 80 in the Y2 direction shown in the figure. For this reason, both end portions of the lock bar 80 are pressed against the edge, on the Y2 side shown in the figure, of the upper end portion, in the vertical direction, inside the guiding hole 27.

The latch member 30 is then rotated clockwise by the vertical component (component in the Z1 direction) of the impelling force of the impelling member 70 that is in the compressed state. As a result, the latch protruding piece 35 of the latch member 30 is held at a non-latched position which is apart from the bottom wall 20c of the frame 20 in the Z1 direction shown in the figure.

Further, in the initial state (non-latched state), the ejector 40 has been moved in the Y2 direction shown in the figure. Therefore, the slider 100 integrated with the ejector 40 is at a position bridging the first fixed contact 201 and the third fixed contact 203, as shown in FIG. 4(a). Therefore, a signal indicating that the first fixed contact 201 and the third fixed contact 203 are in a conductive state and the third fixed contact 203 and the second fixed contact 202 are in a non-conductive state (signal indicating the non-attachment state) is sent via the electric cable W to an external CPU (not shown in the figure). On the basis of this output signal that is produced in the non-latched state, the CPU performs control, for example, to set a belt winding force reduction mechanism to a non-operating state, to set a belt warning light inside the vehicle to the ON state, or to adjust the airbag device to the adequate operating state on the basis of this and other information (for example, seat information).

(2) Operation to Latched State

The latched state in which the tongue plate 14 is attached to the buckle body 11 will be explained below.

Where the distal end portion of the tongue plate 14 is inserted into the gap between the lower end portion 96 of the release button 90 on the buckle body 11 side and the bottom wall 20c of the frame 20, the distal end portion of the tongue plate 14 abuts on the push portion 44 of the ejector 40 and also moves the ejector 40 in the Y1 direction (shown in the figure) which is the insertion direction. In this case, the shaft portion 52 of the cantilever 50 is caused to move together with the ejector 40 in the insertion direction against the impelling force of the impelling member 70, but since the locking portion 51 of the cantilever 50 is pressed against the lock bar 80 in the Y2 direction, the cantilever 50 rotates counterclockwise about the lock bar 80 as an axis.

Where the cantilever 50 rotates counterclockwise, the spring holding protruding portion 53 is moved in the Z1 direction shown in the figure, and the height position of the spring holding protruding portion 53 is set to the same level as the locking protrusion 34 of the latch member 30. In this case, the impelling member 70 is subjected to compression deformation and also bending deformation causing the impelling member to bulge in the Z1 direction shown in the figure. Therefore, the vertical component of the impelling force of the impelling member 70 acts in the Z2 direction shown in the figure. As a result, the cantilever 50 is further rotated counterclockwise by the component of the impelling force in the Z2 direction.

Where the cantilever 50 is rotated counterclockwise, the locking portion 51 of the cantilever 50 pushes the lock bar 80 downward in the Z2 direction shown in the figure, while locking the lock bar 80. In this case, the lock bar 80 moves vertically toward the corner portion in the Z2 direction along the end portion on the Y2 side (shown in the figure) of the guiding hole 27 and applies pressure to the latch member 30 in the Z2 direction shown in the figure. As a consequence, the latch member 30 is rotated counterclockwise about the support arms 31, 32. In this case, the latch protruding piece 35 at the distal end of the latch member 30 is inserted in a latch hole 14a provided at the tongue plate 14 and also enters the guiding hole 23 provided in the bottom wall 20c of the frame 20. As a result, the tongue plate 14 is latched by the latch member 30 (latched state).

Where the tongue plate 14 is latched by the latch member 30, the insertion operation of the tongue plate 14 in the Y1 direction is stopped. However, since the horizontal component of the impelling force of the impelling member 70 acts on the cantilever 50 in the Y2 direction shown in the figure, the ejector 40 carrying the cantilever 50 is slightly moved in the Y2 direction shown in the figure. This is because both end portions of the lock bar 80 that is locked by a catch protrusion 51a of the locking portion 51 are moved horizontally from the corner portions of the guiding hole 27 to the holding portion of the guiding hole 27.

In this case, where the lock bar 80 is moved in the Y2 direction, both ends thereof push the operating recess of the release button 90 in the Y2 direction shown in the figure and therefore the release button 90 is slightly pushed back. As a result, the stopper 60 is rotated counterclockwise about the working shaft 63 and therefore the catch 62 of the stopper 60 pushes the lock bar 80 and locks the lock bar 80 so as to prevent it from returning to the original position. Therefore, the latch member 30 that is pushed by the lock bar 80 in the Z2 direction shown in the figure is prevented from rotating easily in the clockwise direction and the latch member 30 can strongly latch the tongue plate 14.

In such a latched state, the ejector 40 is moved in the Y1 direction shown in the figure. Therefore, the slider 100 that is integrated with the ejector 40 is at the position bridging the third fixed contact 203 and the second fixed contact 202, as shown in FIG. 4(b). For this reason, a signal indicating that the third fixed contact 203 and the second fixed contact 202 are in a conductive state and the first fixed contact 201 and the third fixed contact 203 are in a non-conductive state (signal indicating the attachment state) is sent via the electric cable W to an external CPU (not shown in the figure). On the basis of this output signal that is produced in the latched state, the CPU performs control, for example, to set a belt winding force reduction mechanism to an operating state, to set a belt warning light inside the vehicle to the OFF state, or to adjust the airbag device to the adequate operating state.

(3) Operation of Releasing the Latched State

Where the release button 90 is pushed in the Y1 direction shown in the figure, the bearing groove of the release button 90 pressurizes the working shaft 61 of the stopper 60 in the Y1 direction shown in the figure and therefore the stopper 60 is rotated counterclockwise. As a result, the lock bar 80 caught by the catch 62 of the stopper 60 is released.

At the same time, since the operating recess of the release button 90 pushes both ends of the lock bar 80 in the Y1 direction, the lock bar 80 moves horizontally in the Y1 direction inside the guiding hole 27. In this case, since the lock bar 80 pushes the catch protrusion 51a of the cantilever 50 in the Y1 direction, the cantilever 50 and the ejector 40 are moved in the Y1 direction, thereby compressing the impelling member 70.

Where the release button 90 is further pushed in and the lock bar 80 moves over the corner portion of the guiding hole 27 in the Y1 direction, the cantilever 50 is rapidly rotated clockwise. Because of this rotation operation, the lock bar 80 is raised by the locking protrusion 51a of the cantilever 50 and moved toward the upper end portion in the vertical direction along the guiding hole 27.

At the same time, the height position of the spring holding protruding portion 53 of the cantilever 50 is set lower, on the Z2 side shown in the figure, than the height position of the locking protrusion 34 of the latch member 30. As a result, the latch member 30 is rotated clockwise by the vertical component (component in the Z1 direction) of the impelling force of the impelling member 70 that is in the compressed state. As a consequence, the latch protruding piece 35 of the latch member 30 is released from the latch hole 14a provided in the tongue plate 14 and the guiding hole 23 of the frame 20 (non-latched state), thereby restoring the initial state in which latching of the tongue plate 14 by the latch member 30 is released.

Further, where the cantilever 50 is rapidly rotated clockwise, the ejector 40 is pushed vigorously in the Y2 direction shown in the figure. In this case, since the push portion 44 of the ejector 40 pushes out the distal end of the tongue plate 14 at one stroke in the Y2 direction, the tongue plate 14 is vigorously ejected from the opening 12a. In this state, the ejector 40 returns to the initial state and therefore a signal indicating the initial state is taken out.

As described hereinabove, with the buckle device 10 according to the present embodiment, the fixed contacts 201, 202, 203 of the slide switch that detects the state of attachment of the tongue plate 14 are provided integrally with the resin lower case 13 (outer case). Therefore, the fixed contacts 201, 202, 203 are immobilized inside the buckle body 11 and the positional accuracy of the fixed contacts 201, 202, 203 can be increased. As a result, the relative positions of the tongue plate 14 and the buckle body 11 can be detected with good accuracy and erroneous operation of the switch is prevented.

Further, with the buckle device 10 according to the present embodiment, the movable contact member 110 is provided at the ejector 40, with the slider 100 being interposed therebetween. Therefore, a signal corresponding to the slide position of the ejector 40 can be take out with good accuracy from the contact state of the movable contact member 110 and the fixed contacts 201, 202, 203.

Further, with the buckle device 10 according to the present embodiment, the non-attachment state of the tongue plate 14 to the buckle body 11 is detected when the movable contact member 110 is in contact with both the first fixed contact 201 and the third fixed contact 203, and the attachment state of the tongue plate 14 to the buckle body 11 is detected when the movable contact member 110 is in contact with both the second fixed contact 202 and the third fixed contact 203. Therefore, the state of attachment of the seat belt can be monitored with high reliability, for example, by using the first fixed contact 201 as a normally closed terminal (normally closed contact terminal) and using the second fixed contact 202 as a normally open terminal (normally open contact terminal).

Further, with the buckle device 10 according to the present embodiment, the fixed contacts 201, 202, 203 are constituted by metal plates, and the metal plates are integrated by insert molding with the lower case 13 (outer case). Therefore, the number of parts is decreased and therefore the cost is reduced.

The present invention is not limited to the above-described embodiment and can be changed and modified as appropriate.

For example, in the above-described embodiment, the ejector 40 and the slider 100 are manufactured separately and integrally joined thereafter, and the movable member in accordance with the present invention is constituted by the ejector 40 including the slider 100. However, the two components may be molded as an integral component from the very beginning. Further, the movable contact member 110 may be integrally molded with the slider 100 by insert molding of the slider 100.

Further, in the above-described embodiment, the fixed contacts 201, 202, 203 are integrated by insert molding with the lower case 13, but the integration may be also performed by molding the lower case 13 and then fitting the fixed contacts 201, 202, 203 into a recess formed in the bottom wall 13a of the lower case 13. Alternatively, it is possible to form a hook in advance on the bottom wall 13a of the lower case 13 and then lock the fixed contacts 201, 202, 203 that are mounted from behind with the hook.

The present application is based on Japanese Patent Application (Patent Application No. 2008-306101) filed on Dec. 1, 2008, and the contents thereof are incorporated herein by reference.

We claim:

1. A switch-equipped buckle device comprising:
a tongue plate provided in a seat belt;
a buckle body which has a resin outer case, and to and from which the tongue plate is configured to be attached and detached in an attachment-detachment direction;
an ejector that is provided inside the outer case, the ejector sliding along the attachment-detachment direction of movement defined by the tongue plate from a detachment position where the tongue plate is detached from the buckle body to an attachment position where the tongue plate is attached to the buckle body, and the ejector sliding along the attachment-detachment direction of movement from the attachment position to the detachment position when the attachment of the tongue plate is released; and
a slide switch configured to detect a state of attachment of the tongue plate according to the detachment or attachment position of the ejector, wherein the slide switch includes a movable contact and a fixed contact, the movable contact of the slide switch is coupled to and movable with the ejector in the attachment-detachment direction of movement, the fixed contact of the slide switch is provided integrally within a bottom wall of the outer case and has an upper surface that is exposed at an upper surface of the bottom wall of the outer case, and wherein the upper surface of the fixed contact is flush with the upper surface of the bottom wall.

2. The switch-equipped buckle device according to claim 1, wherein
the buckle body includes the outer case, a frame disposed inside the outer case and having an insertion path for the tongue plate, a latch member that is rotatably provided on the frame and configured to rotate to latch the tongue plate when the tongue plate is inserted along the insertion path, and the ejector is provided on the frame so as to slide along the attachment-detachment direction of movement defined by the tongue plate and push the tongue plate out of the buckle body by sliding from the detachment position to the attachment position when the tongue plate is inserted into the insertion path, and by sliding from the attachment position to the detachment position when latching to the tongue plate is released, and the movable contact being connected and movable with the ejector.

3. The switch-equipped buckle device according to claim 1, wherein the fixed contact is constituted by first, second and third contacts, the third contact is a common contact and is located spaced apart and between the first and second contacts-along a sliding direction of the movable contact, and wherein when the ejector is at the detachment position, the movable contact is in contact with both the first contact and the third contact, and when the ejector is at the attachment position, the movable contact is in contact with both the second contact and the third contact.

4. The switch-equipped buckle device according to claim 1, wherein the fixed contact is respectively constituted by a plurality of metal plates.

5. The switch-equipped buckle device according to claim 4, wherein the bottom wall of the outer case is a molding having the metal plates are integrated therein.

6. A switch-equipped buckle device comprising:
a tongue plate provided in a seat belt;
a buckle body which has a resin outer case, and to and from which the tongue plate is configured to be attached and detached in an attachment-detachment direction;
an ejector that is provided inside the outer case, the ejector sliding along the attachment-detachment direction of movement defined by the tongue plate from a detachment position where the tongue plate is detached from the buckle body to an attachment position where the tongue plate is attached to the buckle body, and the ejector sliding along the attachment-detachment direction of movement from the attachment position to the detachment position when the attachment of the tongue plate is released; and
a slide switch configured to detect a state of attachment of the tongue plate according to the detachment or attachment position of the ejector, wherein the slide switch includes a movable contact and a fixed contact, the movable contact of the slide switch is coupled to and movable with the ejector in the attachment-detachment direction of movement, the fixed contact of the slide switch is provided integrally within a bottom wall of the outer case and has an upper surface that is exposed at an upper surface of the bottom wall of the outer case; and wherein the movable contact is coupled to the ejector by a slider that engages the ejector, the slider being fixed relative to the moveable contact.

7. The switch-equipped buckle device according to claim 6, wherein the slider includes a pin, the pin extending through a pin hole formed in the ejector.

8. A switch-equipped buckle device comprising:
a tongue plate provided in a seat belt;
a buckle body which has a resin outer case, and to and from which the tongue plate is configured to be attached and detached in an attachment-detachment direction;
an ejector that is provided inside the outer case, the ejector sliding along the attachment-detachment direction of movement defined by the tongue plate from a detachment position where the tongue plate is detached from the buckle body to an attachment position where the tongue plate is attached to the buckle body, and the ejector sliding along the attachment-detachment direction of movement from the attachment position to the detachment position when the attachment of the tongue plate is released; and
a slide switch configured to detect a state of attachment of the tongue plate according to the detachment or attachment position of the ejector, wherein the slide switch includes a movable contact and a fixed contact, the movable contact of the slide switch is coupled to and movable with the ejector in the attachment-detachment direction of movement, the fixed contact of the slide switch is provided integrally within a bottom wall of the outer case and has an upper surface that is exposed at an upper surface of the bottom wall of the outer case; and wherein the moveable contact is coupled to the ejector by a pin, the pin extending in a direction transverse to the attachment-detachment direction.

9. The switch-equipped buckle device according to claim 6, wherein the buckle body includes the outer case, a frame disposed inside the outer case and having an insertion path for the tongue plate, a latch member that is rotatably provided on the frame and configured to rotate to latch the tongue plate when the tongue plate is inserted along the insertion path, and the ejector is provided on the frame so as to slide along the attachment-detachment direction of movement defined by the tongue plate and push the tongue plate out of the buckle body by sliding from the detachment position to the attachment position when the tongue plate is inserted into the insertion path, and by sliding from the attachment position to the detachment position when latching to the tongue plate is released, and the movable contact being connected and movable with the ejector.

10. The switch-equipped buckle device according to claim 6, wherein the fixed contact is constituted by first, second and third contacts, the third contact is a common contact and is located spaced apart and between the first and second contacts along a sliding direction of the movable contact, and wherein when the ejector is at the detachment position, the movable contact is in contact with both the first contact and the third contact, and when the ejector is at the attachment position, the movable contact is in contact with both the second contact and the third contact.

11. The switch-equipped buckle device according to claim 6, wherein the fixed contact is respectively constituted by a plurality of metal plates.

12. The switch-equipped buckle device according to claim 11, wherein the bottom wall of the outer case is a molding having the metal plates integrated therein.

13. The switch-equipped buckle device according to claim 8, wherein the buckle body includes the outer case, a frame disposed inside the outer case and having an insertion path for the tongue plate, a latch member that is rotatably provided on the frame and configured to rotate to latch the tongue plate when the tongue plate is inserted along the insertion path, and the ejector is provided on the frame so as to slide along the attachment-detachment direction of movement defined by the tongue plate and push the tongue plate out of the buckle body by sliding from the detachment position to the attachment position when the tongue plate is inserted into the insertion path, and by sliding from the attachment position to the detachment position when latching to the tongue plate is released, and the movable contact being connected and movable with the ejector.

14. The switch-equipped buckle device according to claim 8, wherein the fixed contact is constituted by first, second and third contacts, the third contact is a common contact and is located spaced apart and between the first and second contacts along a sliding direction of the movable contact, and wherein when the ejector is at the detachment position, the movable contact is in contact with both the first contact and the third contact, and when the ejector is at the attachment position, the movable contact is in contact with both the second contact and the third contact.

15. The switch-equipped buckle device according to claim 8, wherein the fixed contact is respectively constituted by a plurality of metal plates.

16. The switch-equipped buckle device according to claim 15, wherein the bottom wall of the outer case is a molding having the metal plates integrated therein.

* * * * *